United States Patent
Luo et al.

(10) Patent No.: US 7,522,651 B2
(45) Date of Patent: Apr. 21, 2009

(54) SOLID-STATE LASERS EMPLOYING INCOHERENT MONOCHROMATIC PUMP

(75) Inventors: Ningyi Luo, Fremont, CA (US); Sheng-Bai Zhu, Fremont, CA (US); Shaoping Lu, Palo Alto, CA (US); Feng Zhou, Kittanning, PA (US)

(73) Assignee: Pavilion Integration Corporation, San Jose, CA (US)

( * ) Notice: Subject to any disclaimer, the term of this patent is extended or adjusted under 35 U.S.C. 154(b) by 418 days.

(21) Appl. No.: 11/052,725

(22) Filed: Feb. 7, 2005

(65) Prior Publication Data

US 2005/0201442 A1     Sep. 15, 2005

Related U.S. Application Data

(60) Provisional application No. 60/551,701, filed on Mar. 10, 2004.

(51) Int. Cl.
*H01S 3/093* (2006.01)
*H01S 3/091* (2006.01)

(52) U.S. Cl. .......................................... 372/75; 372/72

(58) Field of Classification Search ........................ None
See application file for complete search history.

(56) References Cited

U.S. PATENT DOCUMENTS

| | | | |
|---|---|---|---|
| 3,821,663 A | | 6/1974 | Brenner |
| 3,997,853 A | | 12/1976 | Morris |
| 4,150,341 A | * | 4/1979 | Ferguson ..................... 372/72 |
| 4,764,933 A | * | 8/1988 | Kozlovsky et al. ............ 372/75 |
| 4,794,615 A | * | 12/1988 | Berger et al. .................. 372/75 |
| 5,033,058 A | * | 7/1991 | Cabaret et al. ................ 372/75 |
| 5,052,016 A | * | 9/1991 | Mahbobzadeh et al. .. 372/50.11 |
| 5,121,398 A | * | 6/1992 | Rao ............................ 372/71 |

(Continued)

FOREIGN PATENT DOCUMENTS

EP          0 078 941          5/1983

(Continued)

OTHER PUBLICATIONS

Farmer, et al., "Low-Current Density LED-Pumped ND:Yag Laser Using a Solid Cylindrical Reflector", Applied Physics, vol. 45, No. 3, Mar. 1974.

(Continued)

*Primary Examiner*—Minsun Harvey
*Assistant Examiner*—Sean Hagan
(74) *Attorney, Agent, or Firm*—Jeffery J. Brosemer

(57) ABSTRACT

Solid-state laser(s) pumped by incoherent, monochromatic light from sources such as LED arrays and integrating technologies such as high power LED arrays and solid-state laser materials in conjunction with efficient and uniform absorption of pumping energies through a diffusing pump chamber. The resulting laser(s) are compact, robust, low-cost, and able to produce high power output for practical applications. It may efficiently operate over wide temperature and performance ranges, at CW or pulse modes, even with ultra short pulse width and/or extremely high repetition rates. Our inventive structure(s) is/are highly flexible and applicable to a large group of lasing media including those with very short upper state life times. Advantageously, they may be applied to a plethora of laser systems at wavelengths that have important applications and unavailable to other direct pumping technologies.

20 Claims, 16 Drawing Sheets

U.S. PATENT DOCUMENTS

| | | | | |
|---|---|---|---|---|
| 5,455,838 | A | * | 10/1995 | Heritier et al. ............... 372/75 |
| 5,488,626 | A | * | 1/1996 | Heller et al. ................. 372/70 |
| 5,572,358 | A | * | 11/1996 | Gabl et al. ................. 359/347 |
| 5,633,885 | A | * | 5/1997 | Galvanauskas et al. ....... 372/25 |
| 5,940,418 | A | * | 8/1999 | Shields ....................... 372/22 |
| 6,269,108 | B1 | * | 7/2001 | Tabirian et al. ............... 372/75 |
| 2002/0071456 | A1 | | 6/2002 | Wu |

FOREIGN PATENT DOCUMENTS

| | | | | |
|---|---|---|---|---|
| JP | | 05259540 A | * | 10/1993 |

OTHER PUBLICATIONS

Saruwatara et al., "LiNdP4O12 Laser Pumped With an AlxGa1-xAs Electroluminescent Diode", Applied Physics Letters, vol. 27, No. 12, Dec. 1975.

Stone, et al., "Nd:Yag Single-Crystal Fiber Laser: Room Temperature CW Operation Using a Single LED as an End Pump", Applied Physics Letters, vol. 29, No. 1, Jul. 1976.

Budin, et al., "Miniature Nd-Pentaphosphate Laser With Bonded Mirrors Side Pumped with Low-Current-Density LED's", Applied Physics Letters, vol. 33, No. 4, Aug. 1978.

L.J.Rosenkrantz, "GaAs Diode Pumped Nd:Yag Laser", J.Applied Physics, vol. 43, No. 11, Nov. 1972.

* cited by examiner

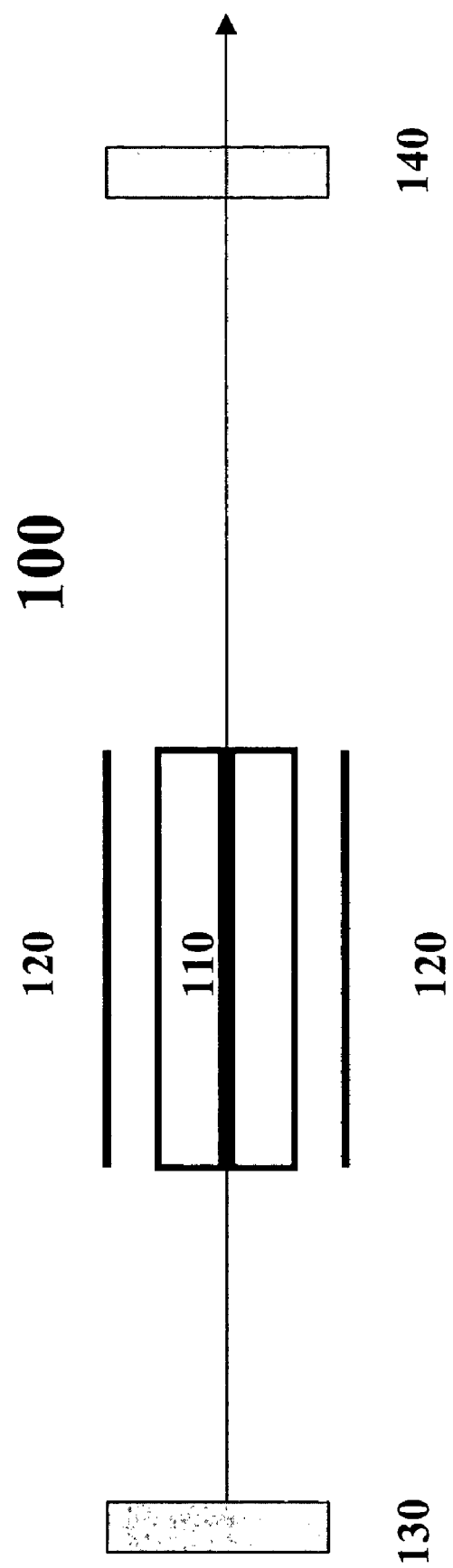

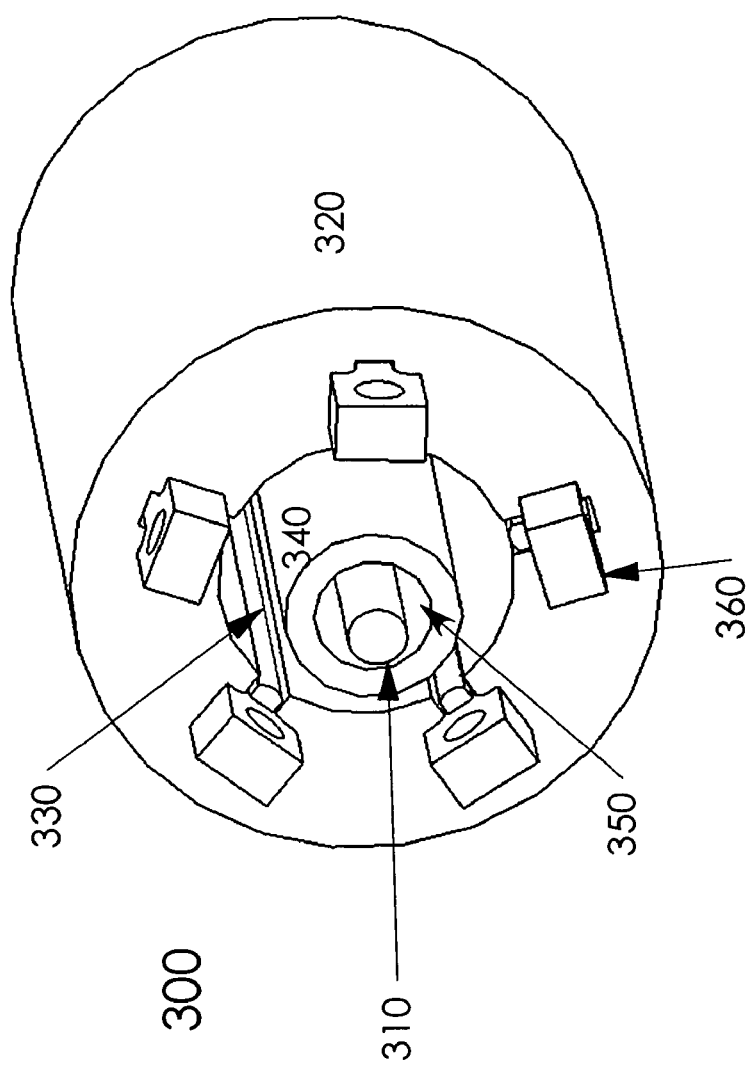

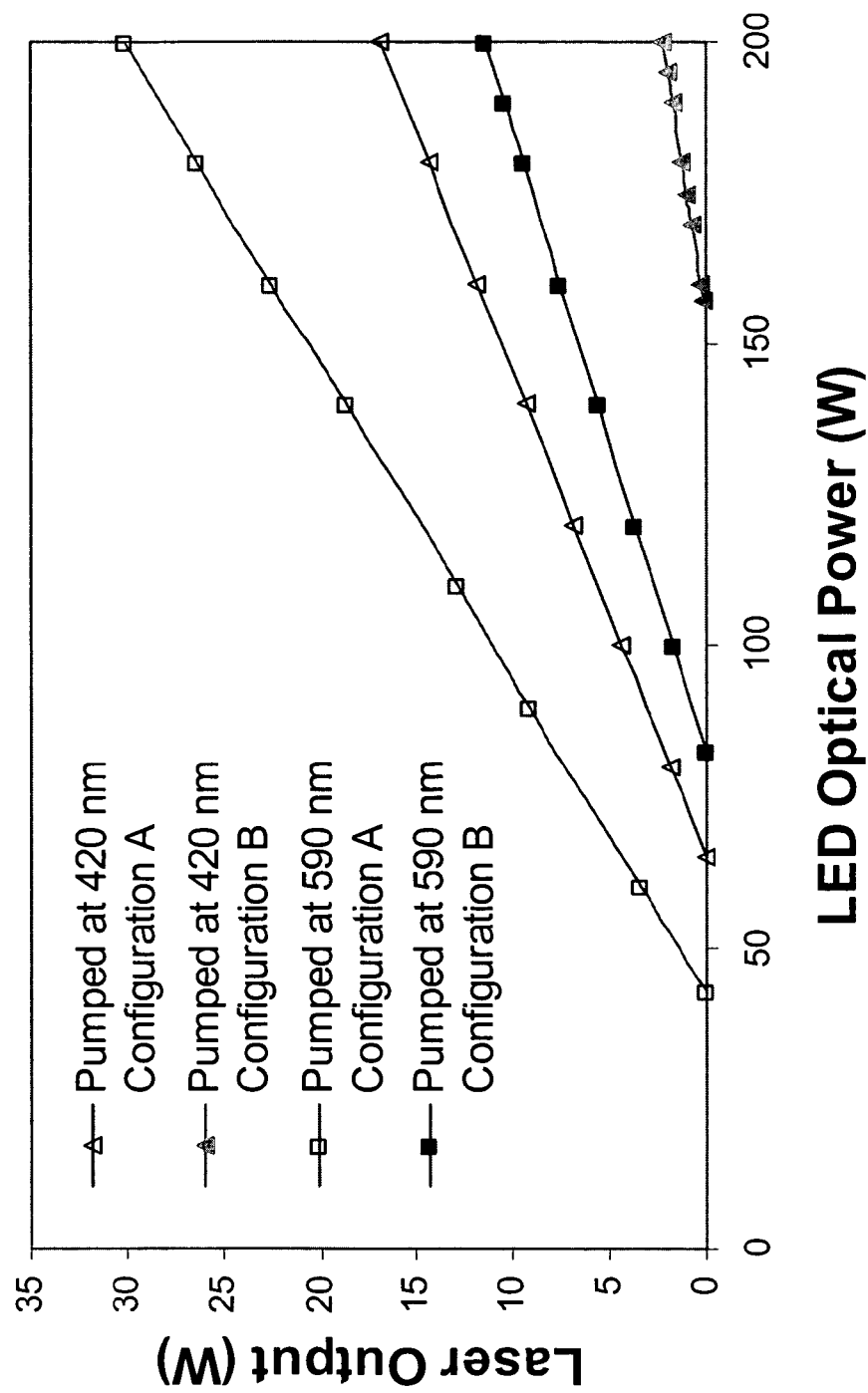

SOLID-STATE LASERS EMPLOYING INCOHERENT MONOCHROMATIC PUMP

CROSS REFERENCE TO RELATED APPLICATION

This application claims the benefit of U.S. Provisional Application No. 60/551,701, filed Mar. 10, 2004, which is hereby incorporated by reference in its entirety.

FIELD OF THE INVENTION

This invention relates generally to the field of solid-state lasers, and more particularly, it relates to solid-state lasers pumped by incoherent monochromatic light sources such as light emitting diode(s) (LEDs).

BACKGROUND OF THE INVENTION

Solid-state lasers have found applications in all areas where high peak power or high continuous power are required. Examples include material processing (cutting, drilling, welding, marking, heat treating, etc), semiconductor fabrication (wafer cutting, IC trimming), graphic arts (printing, copying), biotechnology instrumentations (proteomics, DNA sequencing, flow cytometry), medical applications (diagnosis, therapy, micro-surgery), military applications (range finding, target designation), entertainment (laser TV, DVD), and scientific research, to mention a few.

Unlike semiconductor or diode lasers, which are almost always pumped electrically, solid-state lasers based on active ions doped in crystals or glasses are optically pumped. One of the key components of a solid-state laser therefore is an efficient and low-cost light source to provide the optical pumping.

Such optical pumping of solid-state lasers requires the efficient conversion of electrical energy into optical radiation, and an efficient coupling between the generated high-radiation fluxes and the solid-state laser active (gain) medium. Efficient coupling requires a close match between the output spectrum of the pumping source and the characteristic absorption bands of the particular gain medium employed. To maximize the laser output and minimize thermal effects, precise spatial overlap and uniform absorption of pumped photons over the laser mode volume is important.

Flash lamps, arc lamps, laser diodes, and some nonelectric light sources have been employed to pump solid-state lasers over the past years. All of these pumping sources have serious limitations and drawbacks, however.

Historically, flash lamps have been widely utilized for pumping solid-state lasers partly because of their high conversion efficiency. However, due to their non-monochromatic output, the coupling efficiency is generally low. Increasing the flashlamp's filling pressure could improve the conversion efficiency, however, this would require higher trigger voltage and the simmer current would be more difficult to establish and maintain. The flashlamp's low coupling efficiency causes a large amount of heat to be generated during the pumping, which limits repetition rates of solid-state lasers pumped by flash lamps. Additionally, the excessive heating leads to undesirable thermal effects such as thermal birefringence, thermal lensing, and even thermal damage. Finally, flash lamps typically exhibit short operating lifetimes. Consequently, their frequent replacement is necessary.

In sharp contrast to flash lamps, semiconductor diode lasers produce characteristically narrow emissions, which may be advantageously matched to the absorption peak of a laser's active medium, resulting in a high coupling efficiency. Unfortunately however, semiconductor lasers are effectively low-peak-power devices and as such, are not applicable to high peak power pulsed mode operations and can be easily damaged by electrostatic discharge or current spikes. Moreover, the available output wavelengths of diode lasers are limited. Consequently, some wavelengths in the visible spectrum that have important applications—such as pumping vibronic crystal lasers—are not available with diode lasers. Finally, diode lasers have a relatively short lifetime of only 5,000 to 10,000 hours and their cost is relatively high.

Previously designed solid-state lasers side-pumped by diode lasers required that their temperature be strictly controlled and were much less efficient than desired. When used as a laser pump, the light output from a diode laser is directed to an end or a side of the laser's active medium by lenses, optical fibers, mirrors or lens ducts. And in spite of its high operating efficiency, diode laser pumping often does not operate over desirable temperature ranges unless inefficient and oftentimes cumbersome temperature control is used.

Typically, side-pumped lasers use cylindrical rods and thus do not exhibit efficient mode-pump overlap, which is particularly problematic for high power scaling. In a side-pumped configuration, low dopant percentage must be used to avoid absorption of pumping energy concentrated near the surface of the laser medium, which may lead to poor overlap between the laser mode and the pumped volume and therefore, hot spots inside the gain medium which results further in the degradation of the quality of the laser beam.

Still other attempts were made to pump solid-state lasers with other semiconductor sources, in particular, incoherent monochromatic light sources such as the high-intensity Amplified Spontaneous Emissions (ASE) from rare-earth-doped fluoride, telluride and silica fibers, ASE from superluminescent diodes, spontaneous emission from light emitting diodes (LEDs), and incoherent or partially coherent emission from vertical cavity surface emitting laser (VCSEL) arrays. Among them, LEDs and VCSELs are of particular interest, because their spectral bandwidths may suitably match the absorption spectrum of the lasing medium. In addition, high power LEDs and VCSELs offer some particularly important wavelength ranges—where conventional high power edge emitting laser diodes are unavailable. And unlike a flashlamp, which runs with an expensive high-voltage power supply of a large footprint, an LED can be driven easily with a low-voltage power supply.

As an initial example, in U.S. Pat. No. 3,997,853, Morris, et al. described that single crystals of chromium-doped beryllium aluminate were capable of operating at the room temperature and being pumped by a variety of optical pumps including incoherent semiconductor diode emitters such as gallium arsenide and gallium phosphide.

In a paper published in Journal of Applied Physics, Vol. 45, No. 3, March 1974, Farmer and Kiang described the results of LED-pumped neodymium-doped yttrium aluminum garnet (Nd:YAG) lasers. In particular, they described a solid-glass half-cylinder used for index matching and as a pumping cavity reflector for their Nd:YAG laser.

A $LiNdP_4O_{12}$ laser pumped with an $Al_xGa_{1-x}As$ electroluminescent diode was described by Saruwatara et al. in a paper published in Applied Physics Letters, Vol. 27, No. 12 on 15 Dec. 1975. Therein, the authors disclosed that using an incoherent $Al_xGa_{1-x}As$ light-emitting diode as a pump source, pulsed laser oscillation was observed in a $LiNdP_4O_{12}$ crystal cooled to −35° C.

Additional Nd:YAG investigations were performed and described by Stone, Burrus, and Dentai in a paper appeared in Applied Physics Letters, Vol. 29, No. 1, 1 Jul. 1976. The authors achieved CW laser action using single-crystal Nd:YAG fibers end-pumped by a single high-radiance LED.

In a paper appeared in Applied Physics Letters, 33(4), 15 Aug. 1978, Budin et al. described a laser made of a 1-cm-long $Nd_{0.75}La_{0.25}P_5O_{14}$ crystal with bonded mirrors, side pumped with two arrays of light-emitting $AL_{0.1}Ga_{0.9}As$ planar diodes in a double cylindrical-elliptical cavity. Pulsed operation (0.6 ms) at $-3.5°$ C. and CW lasing at $-49°$ C. were obtained, respectively, with LED current densities of 700 and 270 $A/cm^2$.

More recently, a "Miniature fabry-perot laser structure" was described in United States Patent Application No. 20020071456. Described therein, a laser structure consisting of an unguided uniform gain element and two mirrors forming a Fabry-Perot cavity was coupled to an LED pump.

Despite limited progress, prior art attempts at pumping solid state lasers with LED's typically followed paths taken by diode laser pumped devices, and consequently never realized potential benefits associated with LEDs. Our invention advantageously addresses these deficiencies.

SUMMARY OF THE INVENTION

Accordingly, we have invented a solid-state laser that is pumped by incoherent, monochromatic light from sources such as arrays of LEDs or incoherent VCSELs. And in sharp contrast to the prior art our invention provides for the efficient coupling and absorption of incoherent monochromatic pump light, resulting in a compact, robust, and relatively low-cost laser that may efficiently operate over wide temperature and performance ranges while consuming relatively low power consumption.

Viewed from a first aspect and according to our invention, incoherent light emanating from an incoherent monochromatic source such as an LED or VCSEL is coupled into a laser gain medium through the use of a diffusing pump chamber. Our inventive pump chamber provides for multi-bounce reflections of unabsorbed pump light, resulting in uniform distribution of gain medium excitation, while at the same time, providing a convenient mechanical mounting for the source and associated driver electronics. Still further, our inventive pump chamber provides for the efficient conduction of heat—away from the lasing components—resulting in a laser capable of sustained, high-power, continuous (CW) or pulsed output—including those with extremely high repetition rates.

Viewed from another aspect, our inventive teachings result in solid state lasers exhibiting three basic characteristics, namely, 1) the efficient delivery of pump energy into a lasing media; 2) the efficient transfer of excited energy into stimulated emission with minimum loss from spontaneous emission or non-radiative quenching—a characteristic particularly important for laser materials having short upper state lifetimes; and 3) the novel integration of technologies such as high power LED arrays and solid-state laser materials in conjunction with the uniform absorption of pumping energies. The resulting inventive structures are highly flexible, and therefore applicable to a large group of lasing media, operating at different modes that may be applied to a plethora of laser systems at wavelengths that have important applications not available to direct pumping technologies.

BRIEF DESCRIPTION OF THE DRAWING

Further objects of the invention will be more clearly understood when the following description is read in conjunction with the accompanying drawing in which:

FIG. 1A illustrates an embodiment of a basic solid-state laser according to the present invention;

FIG. 3B is a 3-D illustration of the structures depicted in FIG. 3A;

FIG. 5C is a graph showing the performance of Alexandrite laser pumped with red and blue LEDs, both with, and without employing the full teachings of the present invention;

DETAILED DESCRIPTION

Figure 1B:
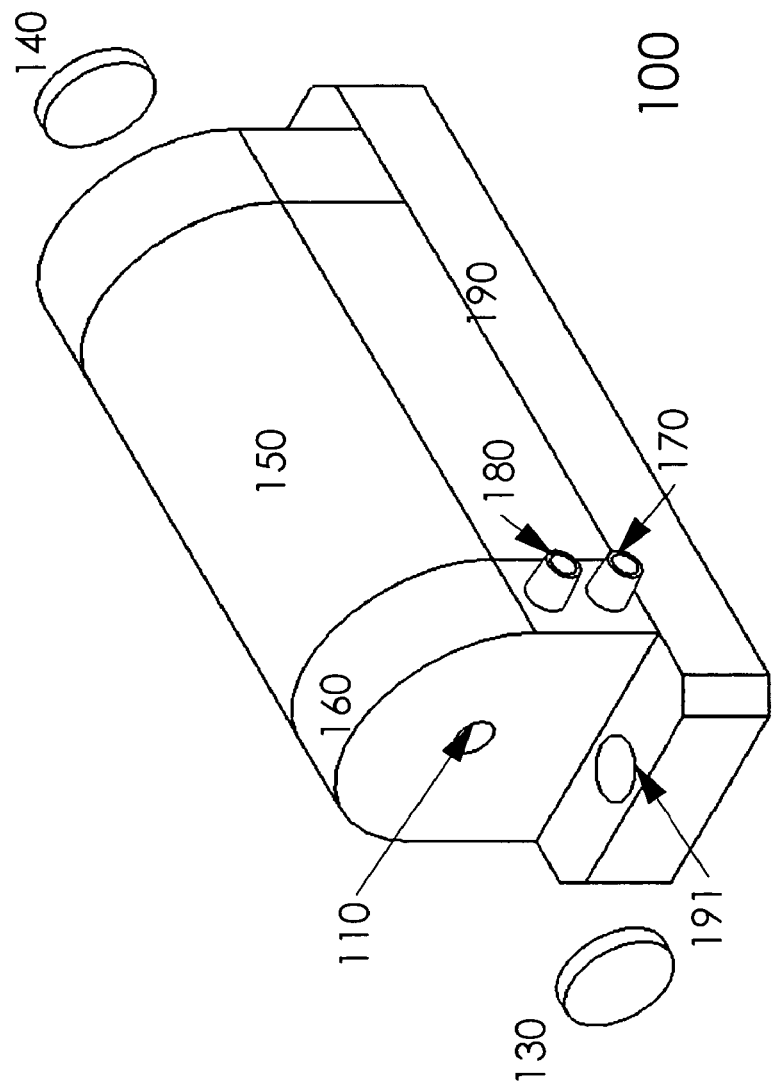
FIG. 1B is a 3-D illustration of the structure(s) depicted in FIG. 1A.

Referring now to drawings and in particular to FIG. 1A, where an embodiment of a basic laser system 100, oftentimes called a "laser head", is shown constructed according to the present invention. More specifically, an LED-pumped solid-state laser is illustrated therein.

When operational, laser gain medium 110 is pumped by LED arrays 120—disposed along a length of the medium 110. The output emission spectra of the LED arrays 120 are selected to suitably match the absorption spectrum of the gain medium 110, which has a characteristic broadband absorption. A resulting laser oscillation is generated in a laser or oscillation cavity formed between a highly reflective (HR) mirror 130 and an output coupler 140. As can be readily appreciated by those skilled in the art and as will be discussed in greater detail later, the selection of LED array output, laser gain medium, configuration, and operation mode, is a matter of design choice and highly flexible with our inventive teachings.

Turning our attention now to FIG. 1B, there is shown a 3-D illustration of a laser head section of the laser system depicted in FIG. 1A with two laser cavity mirrors 130 and 140, disposed at each end of the laser, respectively. The laser assembly is preferably covered by shell 150 and affixed to mounting plate 190. One or more locating holes 191 are used for mounting the locating plate 190 and consequently the overall assembly, to another surface as required by the particular application.

In the configuration shown in FIG. 1B, since the laser cavity mirrors 130, 140 are positioned external to the shell 150, vias or other passageways, disposed in end plates 160, permit optical communication between the gain medium 110 and cavity mirrors 130 and 140. As is understood with respect to this FIG. 1B, the resonant or laser cavity is defined by the optical path that exists between the cavity mirrors 130, 140, including the gain medium 110.

Continuing with our discussion of FIG. 1B, end plates 160 are located at each end of the laser assembly. Such end plates may preferably fix appropriate component(s), such as a laser rod and/or glass tube (or other elements), in an axial, or any other desired alignment. An index matched coolant—such as water or other heat-conductive fluid with appropriate index of refraction is circulated though the system and as such may flow into inlet 170 and out from outlet 180 for cooling the laser medium (110 in FIG. 1A) LED arrays (120 in FIG. 1A), as well as other internal structures as necessary or desired.

Figure 1C:
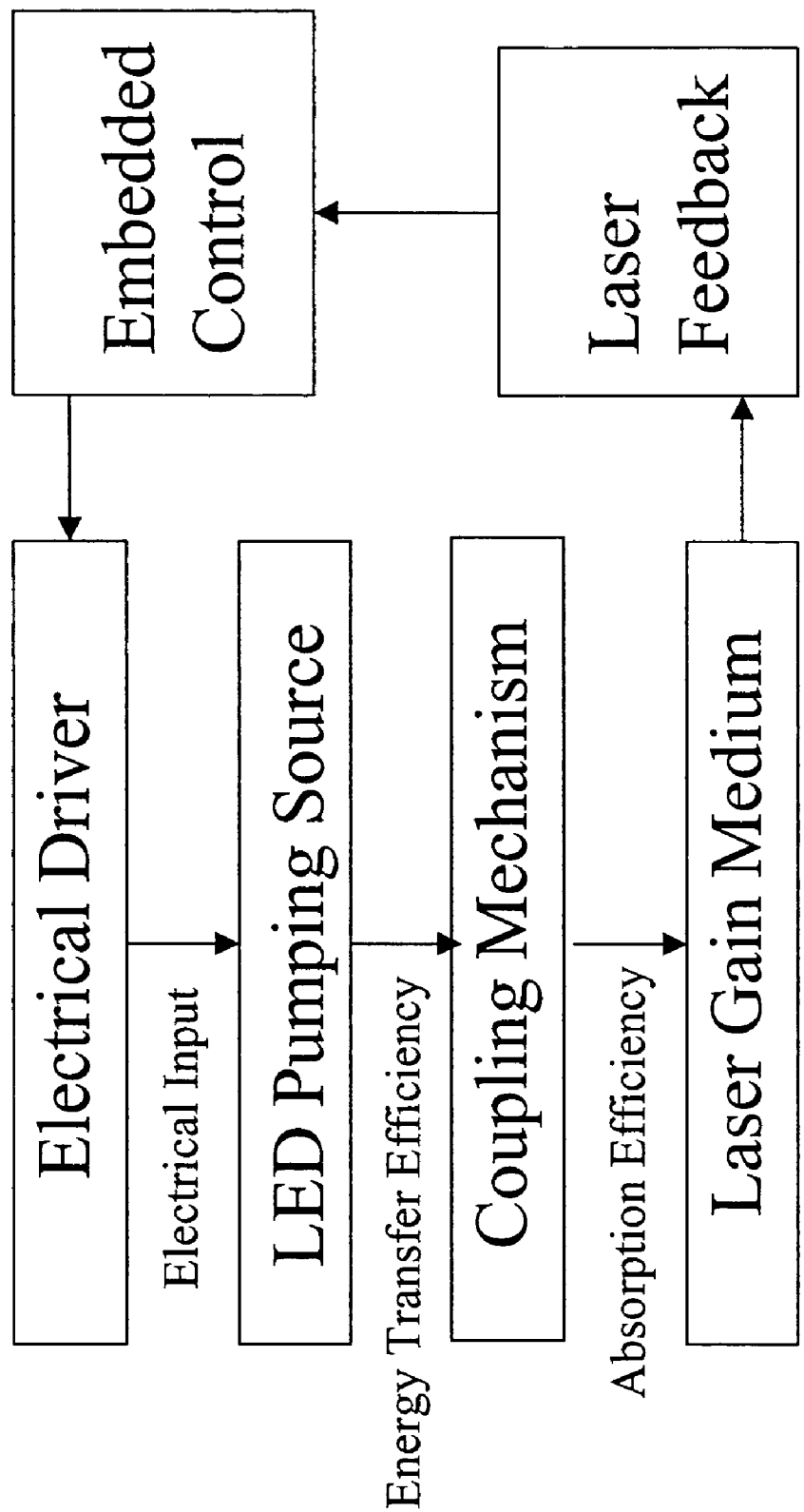
FIG. 1C is a functional block diagram of a solid-state laser according to the present invention.

FIG. 1C is a functional block diagram of a solid-state laser constructed according to the present invention. The LED pump source, which is specifically labeled as 120 in FIG. 1A, is energized by the electrical driver (not shown in FIG. 1A). Part of the electrical energy is converted into incoherent and monochromatic radiation, which is further delivered into the laser gain medium, labeled as 110 in FIG. 1A, through the coupling mechanism. The driving energy is advantageously controlled through laser feedback. As can be readily appreciated by those skilled in the art, our inventive teachings, when combined with state-of-the-art computer controlled feedback, permits advantageously variable laser output, including pulsed output as well as sophisticated variable pulsed output all under computer or other automatic control.

Figure 2A:
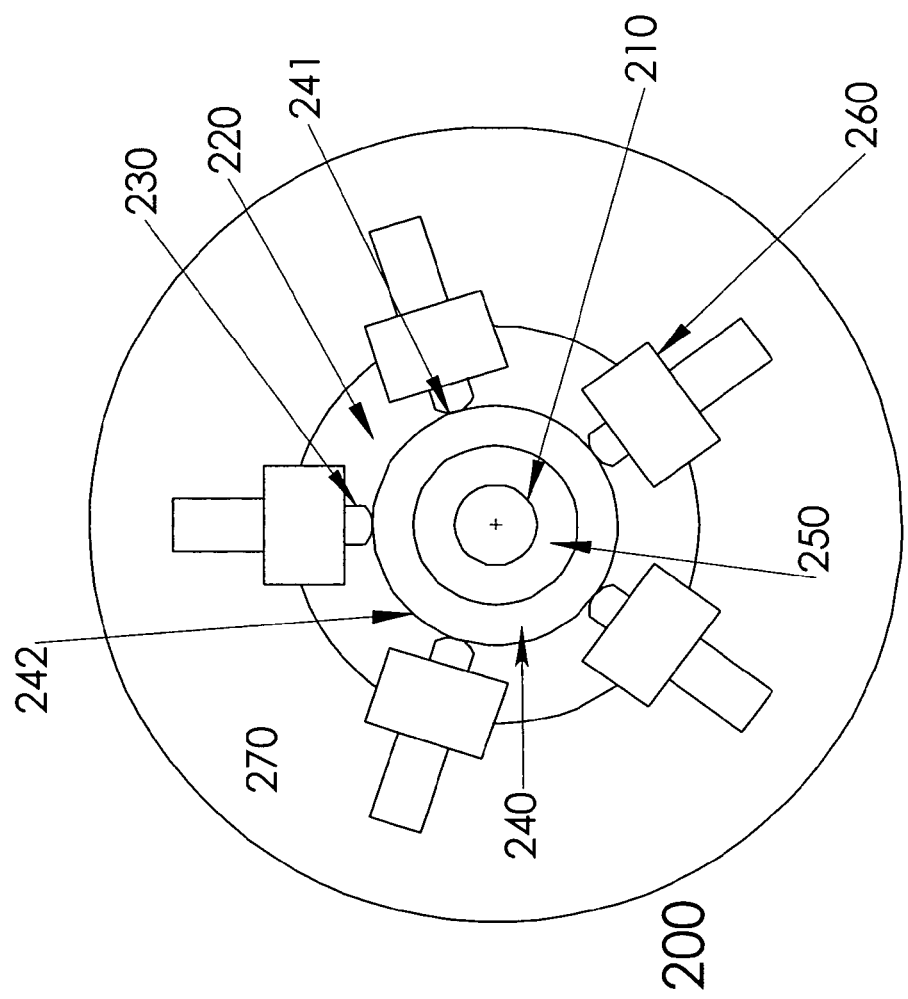
FIG. 2A shows a schematic, cross-sectional view of a pumping configuration according to the present invention.

With reference now to FIG. 2A, there is shown in schematic form, a cross-sectional view of a solid-state laser 200 constructed according to our inventive principles. In particular, a laser gain medium 210 is shown at the center or core of the inventive laser structure. The laser gain medium 210, is situated within a tube 240 and axial aligned therein. Disposed along the outer perimeter of the tube 240, are pump sources—which are shown in this FIG. 2A as LED arrays 230. The entire assembly is further positioned within a housing 270.

Advantageously, and as can be readily appreciated by those skilled in the art, our inventive teachings are applicable to a variety of laser gain media, for example, Nd:Cr:GSGG, Alexandrite, Ti:Sapphire, Nd:YVO4, Nd:GdVO4, Nd:YAG, Nd:KGW, Cr:Sapphire (usually known as Ruby), Cr:LiSAF, Cr:YAG, Cr:Forsterite, Er:YLF, and Nd:glass, as well as other solid state materials that exhibit a spontaneous emission of photons as a result of a population inversion initiated by gain medium excitement with absorption-matching incoherent monochromatic sources such as arrays of LEDs or VCSELs. Additionally, active ion doping levels may vary vastly to meet desired operating conditions and/or to desirably modify the mode-pump overlap.

Continuing with our discussion of FIG. 2A, it is important to remember that the diagram depicts an exemplary cross-sectional view of our inventive laser structure 200. Consequently, the laser gain medium 210 is rod, or cylindrically shaped, and is shown as the innermost component of laser structure 200. It is understood that, the precise cross-sectional shape of the laser gain medium may vary considerably, with circular, elliptical, rectangular, hexagonal, octagonal and polygonal shapes all being possible with our invention. Additionally, and depending on the required laser output, the precise length of the laser gain medium may vary considerably as well.

Proceeding with our discussion outward from the laser gain medium 210, we observe a gap 250, which, in a preferred embodiment, contains a circulating, index matched coolant such as water (distilled or deionized) or salt solutions exhibiting an appropriate index of refraction to index match laser gain medium rod 210 and diffusion chamber 240 that is constructed from a glass (or other suitable material transparent to the pumping light) tube. The gap 250 is a space or other void formed between the outer surface of the laser gain medium 210 and the inner surface of the tube 240.

The circulating, indexed matched coolant liquid (not specifically shown) removes heat generated during laser operation thereby maintaining laser thermal stability. Preferably, it is transparent to the pump light produced by an LED or other pump source employed. Furthermore, when water or salt solutions are used as the indexed matched coolant, parasitic oscillation at near-IR is substantially suppressed due to the high absorption at these bands. As can be appreciated by those skilled in the art, alternative cooling methodologies may be employed which do not specifically include circulating, index-matched liquids.

Shown further in FIG. 2A are five (5) LED arrays 230 that are positioned evenly spaced around the outer perimeter of tube 240. Each individual LED array 230 includes a number of individual LEDs (not specifically shown), typically arranged and packaged one by one. Each individual LED emits its respective pump light that illuminates and pumps the laser gain medium 210. Advantageously, the specific number of the LEDs in each array and their particular operational and emission characteristics may be selected to enhance or otherwise optimize the performance of the laser. Of course, and as will be readily understood, the total pumping energy generated by the LED arrays 230 must be sufficient to induce lasing operation while not being too high to avoid efficiency reduction and, probably, thermal damage.

It should be noted and understood at this point that our invention is not limited to the 5 arrays as is shown. Fewer or more may be used, depending upon their characteristics and the characteristics of the laser gain medium 210 employed. A preferred embodiment, however, will likely have an odd number of LED arrays. In particular, 3 or 5 of LED arrays spaced around a gain medium are appropriate for LEDs having a divergence angle of ~60°.

Each of the LED arrays 230 is mounted on fixtures 260 which may also serve as LED driver mounting base and heat sinks, carrying any excessive heat away from LED arrays 230 as appropriate. The outermost housing is preferably a metal shell 270, or other material that provides suitable physical protection of the laser system and heat dissipation characteristics. Accordingly, heat-conductive plastics or ceramics are suitable materials for incorporation into our inventive laser.

Preferably, the outer surface 242 of the tube 240 is coated to be highly reflective, except for generally slot-shape areas providing transmitting windows 241 for the LED pumping light to enter into the tube 240 and subsequently into the gain medium 210. The transmitting window 241 slots are anti-reflective (AR) coated to minimize reflection loss at the pump wavelength. In addition, the outer surface 242 of the tube 240 may be etched to be uneven and coated with dielectric HR film or metallic film to provide diffusive reflection of pump light.

As can be noted further by examining the structure of FIG. 2A, an additional gap or chamber 220 is formed between the outer surface of the tube 240, and an inner surface of the housing or shell 270. This gap 220 can be filled with highly diffusive reflecting materials such as Spectralon, BeO, MgO, BaSO4, or ceramics for diffuse reflection, and the outer surface 242 of the tube 240 can then be all AR coated. Such a configuration results in this outer gap 220 effectively serving as a "diffusion" chamber, which further enhances the coupling efficiency of pump light, emitted from the arrays of LEDs 230, and the gain medium 210.

When operational and energized, the LED arrays 230 emit light at a wavelength characteristic of the particular LED. Advantageously, this operation may be made continuous, pulsed, or some desirable variation thereof.

The light emitted from the LED arrays 230 passes through respective AR transmitting windows 241, the tube 240, the index matched coolant (water or other appropriate liquid) 250, and into the laser gain medium 210. In a well-designed system, most of the light emitted from the LED arrays 230 strikes and is subsequently absorbed by the gain medium rod 210. Nevertheless, a portion of that emitted light is either not absorbed by the gain medium rod or fails to strike it altogether.

With our inventive laser structure, and according to our inventive teachings, emitted pump light that is not absorbed by the gain medium rod 210 or does not initially strike the rod 210, is reflected back internally towards the gain medium rod through the effect(s) (either combined or individually) of the reflective outer surface 242 of the tube 240, diffusive material (not specifically shown) situated in gap 220, or a highly reflective inner surface of housing 270.

Figure 2B:
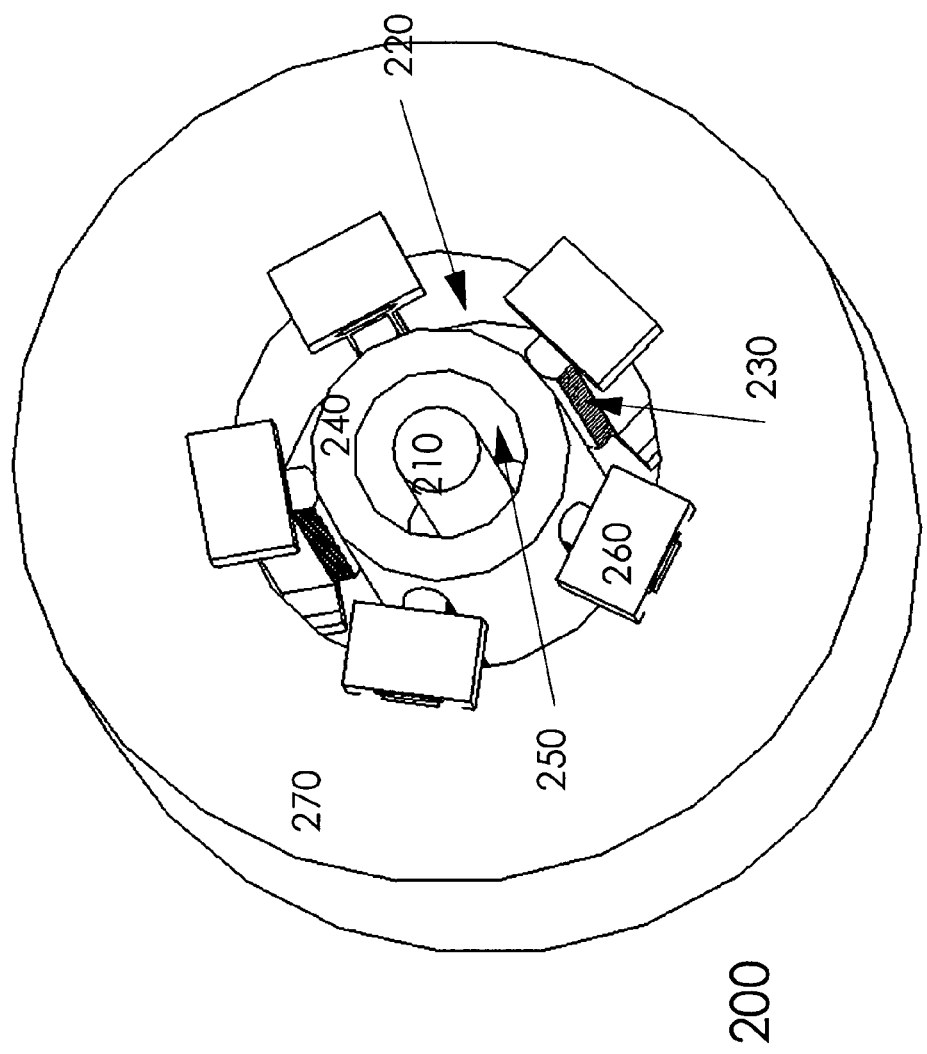
FIG. 2B is a 3-D illustration of the structure(s) depicted in FIG. 2A.

FIG. 2B provides a perspective, 3-D view of the inventive structure of FIG. 2A.

Figure 3A:
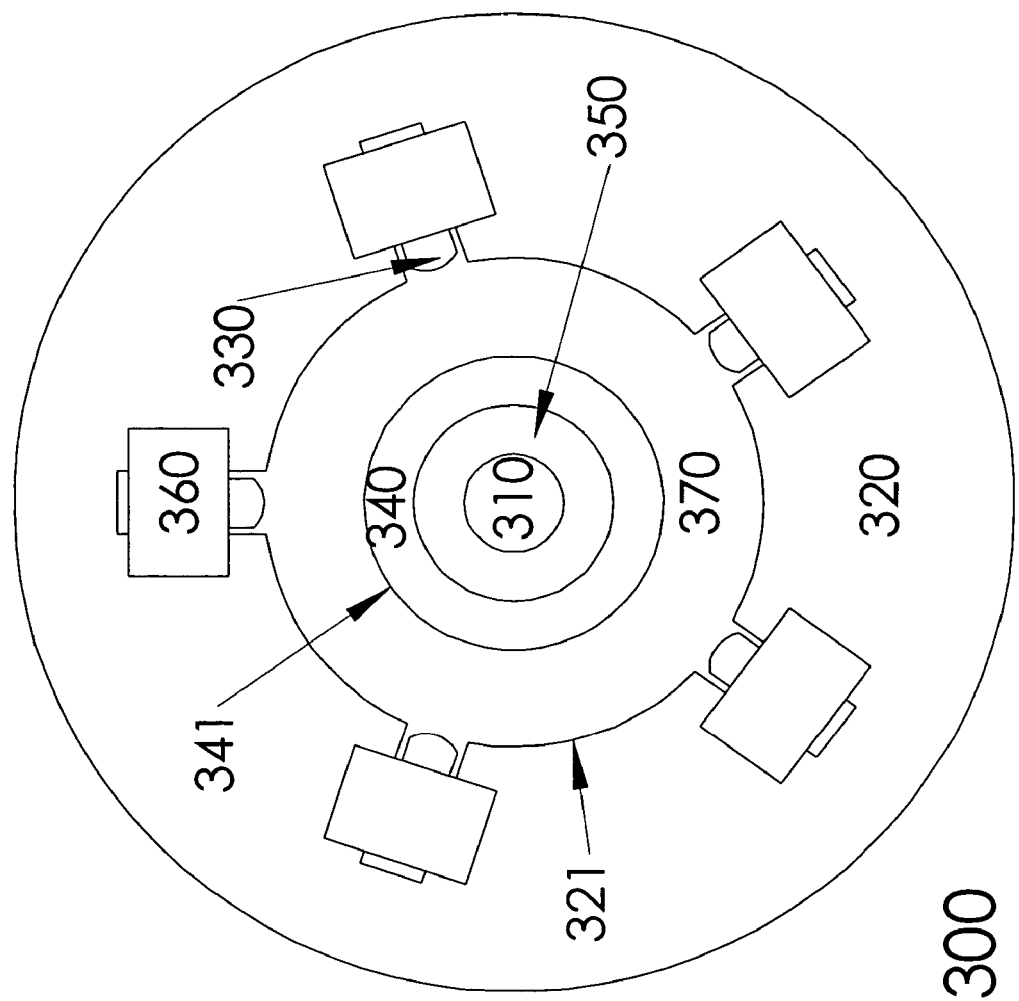
FIG. 3A is a schematic, cross-sectional view of an alternative pumping configuration according to the present invention.

Turning our attention now to FIG. 3A, there is shown a schematic cross-sectional view of an alternative embodiment of a solid-state laser exhibiting our inventive concepts. In particular, laser assembly 300 includes a gain medium 310, positioned within and in axial alignment with, a tube 340, which is transparent to the pumping light, and a number of LED arrays 330, positioned around the outer perimeter of the tube 340 and preferably disposed uniformly around the inner surface of shell 320. As was discussed earlier, the number of LED arrays is preferably an odd number, i.e., 3, 5, 7, etc. and the length of each array is positioned such that it is parallel to the length of the gain medium 310. FIG. 3B provides a perspective, 3D-view of the structure depicted in FIG. 3A for additional, simultaneous reference.

The outer surface 341 of tube 340 is coated with a material that is antireflective (AR) at the pumping wavelength. Consequently, light emitted from the LED arrays 330 is not significantly reflected by this outer surface of the tube 340. In addition, the coating may beneficially contain a special layer or certain materials exhibiting strong absorption at the lasing wavelength to suppress unwanted ASE and, therefore, to eliminate parasitic laser transitions. In an exemplary embodiment, the tube 340 is constructed from common borosilicate glass material, i.e., Pyrex, or other dimensionally stable, chemically resistive, and optically transparent materials sufficient to permit the satisfactory optical pump of the laser gain medium 310.

Concentrically overlying the tube 340 is gap 370 that formed in a void existing between the tube 340 and the inner surface of shell 320.

The tube 340 is shown as being cylindrical in shape, and within its hollow core is positioned laser gain medium rod 310, which runs lengthwise, in axial alignment with the tube 340. Bathing the rod, and contained within the tube 340, is an index-matched coolant, which is preferably circulated to remove heat from the operating laser assembly.

Continuing with our discussion of the laser structure 300 depicted in FIG. 3A, each of the LED arrays 330 is mounted on fixtures 360 which may also serve as heat sinks. The inner surface 321 of shell 320 is preferably roughened and coated with HR metallic film or dielectric film or polished metal surface to provide effective diffused reflection.

With this structural discussion in place, we may now better understand the operational aspects of our inventive laser structure. In particular, and with continued reference to FIG. 3A, one or more of the individual diodes contained in LED arrays 330 are energized such that they emit one or more characteristic pump lights. It is important to note that the operation of the LEDs may be continuous or selectively turned on or off such that they operate intermittently and thereby "pulse" the laser. In addition, where multiple arrays of LEDs are disposed around the perimeter of a laser gain medium, such as in this FIG. 3A, individual arrays or LEDs may be selectively operated—preferably under computer or other automatic control—to produce a desired output. Moreover, where the LED arrays are disposed lengthwise (as in FIG. 3B) along the laser gain medium 310, the LEDs may be selectively operated along the length as well as the perimeter to realize any beneficial operational performance that may result from such operation.

Preferably with negligible loss, the light emitted from the LEDs passes through the tube 340 and the gap 350 containing index-matched coolant. While much of the light does strike the laser gain medium 310, that portion of the light which does not, or which passes through the gain medium 310, will eventually strike the highly reflective (HR) inner surface 321 of outer chamber (shell) 320 where it will be reflected back towards the laser gain medium 310. This process may be repeated a number of times, thereby enhancing the efficiency of the inventive structure while promoting a uniform gain distribution within the gain medium. In this exemplary configuration, the pump or diffusion chamber may be defined by those regions of the structure between the inner surface of the outer shell 321 and the gain medium 310.

To further enhance the pump uniformity, the outer surface of the laser gain medium rod 310 may be ground to give a surface roughness of 20 to 100 micro inches RMS. Advantageously, our inventive structures may be quite compact—, the overall dimensions of the structure depicted in FIG. 3A may be on the order of 30 mm×20 mm, or smaller.

As should be apparent to the person skilled in the art at this point, there are a number of other alternative embodiments of our inventive solid-state laser structures. For instance, our inventive concepts may be enhanced through the use of a pair of lenses or a single lens, located at an exit aperture of the LED arrays (230 in FIG. 2A or 330 in FIG. 3A) to further guide and confine the pump light towards the laser gain medium 210. Alternatively, our inventive concepts may be further enhanced by the use of LED arrays with a photonic crystal layer or polymer domes or coupling lenses for efficiency improvement. FIG. 3B provides a perspective, 3D view of the inventive structures depicted in planar view in FIG. 3A.

Now, we turn our attention to solid-state laser materials, incoherent monochromatic pump light sources such as LEDs, and their couplings. As can be appreciated, recent advances in visible wavelength high power LEDs enable efficient excitation of solid-state lasers, in particular, near IR tunable lasers and femtosecond short pulse lasers based on vibronic laser materials. Advantageously, the incoherent emission from such high power LEDs typically has a bandwidth of ~40 nm and can be packaged to radiate within a limited divergence angle of ~±30°. Still further, there exist a number of emitting wavelengths that can be selected to match the desired absorption spectra of a particular lasing media. At this time, the reader is referred to Table I, and in particular three representative materials, namely, Alexandrite, Nd:Cr:GSGG, and Ti:Sapphire.

Alexandrite ($BeAl_2O_4:Cr^{3+}$) can produce tunable laser emission at 700 nm-818 nm. Due to the relatively long spontaneous lifetime of its upper state, i.e., 260 µs at 25° C., an Alexandrite laser can be operated at CW or pulse mode. More importantly, it has an absorption spectrum, peaked around 420 nm with FWHM bandwidth of 100 nm and 590 nm with FWHM of approximately 170 nm, which is a good match for the blue light (420 nm, FWHM≈30 nm) and orange light (590 nm, FWHM≈30 nm) emanating from GaInN/GaN or InGaAsP/GaAsP LEDs.

Nd:Cr:GSGG is an important source of 1061 nm laser, both CW and pulsed. In Nd:Cr:GSGG lasers, $Cr^{3+}$ is a sensitizer, utilized for improving efficiency through the mechanism of transferring excitation. Due to the broad absorption bands of chromium, the material can efficiently absorb light throughout the whole visible region of the spectrum, although it is particularly sensitive to blue light such as the emission from GaInN/GaN LED.

Owing to its broad tunable output range, from 670 nm to 1070 nm, and a relatively large gain cross-section, the Ti:Sapphire ($Ti:Al_2O_3$) laser is probably the most widely used tunable solid-state laser. However, up to date direct pumping is unavailable or difficult to be realized. This material exhibits a broad absorption band, located in the blue-green region of the visible spectrum with a peak around 490 to 510 nm and FWHM≈50 nm. Unfortunately, there are currently no suitable diode lasers to match this range. Additionally, and due to its very short fluorescence lifetime—around 3.2 µs—direct flashlamp pumping is difficult. Fortunately, these problems now can be overcome as a result of our inventive teachings that make use of LEDs.

For example, green light emanating from GaInN/GaN LED is peaked at 505 nm with the FWHM of almost 40 nm, and offers suitable pumping source for Ti:Sapphire crystal. Due to a huge selection of LED output wavelengths, it should be possible to find appropriate LED arrays for most of common solid-state laser materials. Moreover, LEDs can be operated at very high frequencies with high duty cycle, making pulsed laser output of high repetition rates possible.

Figure 4:
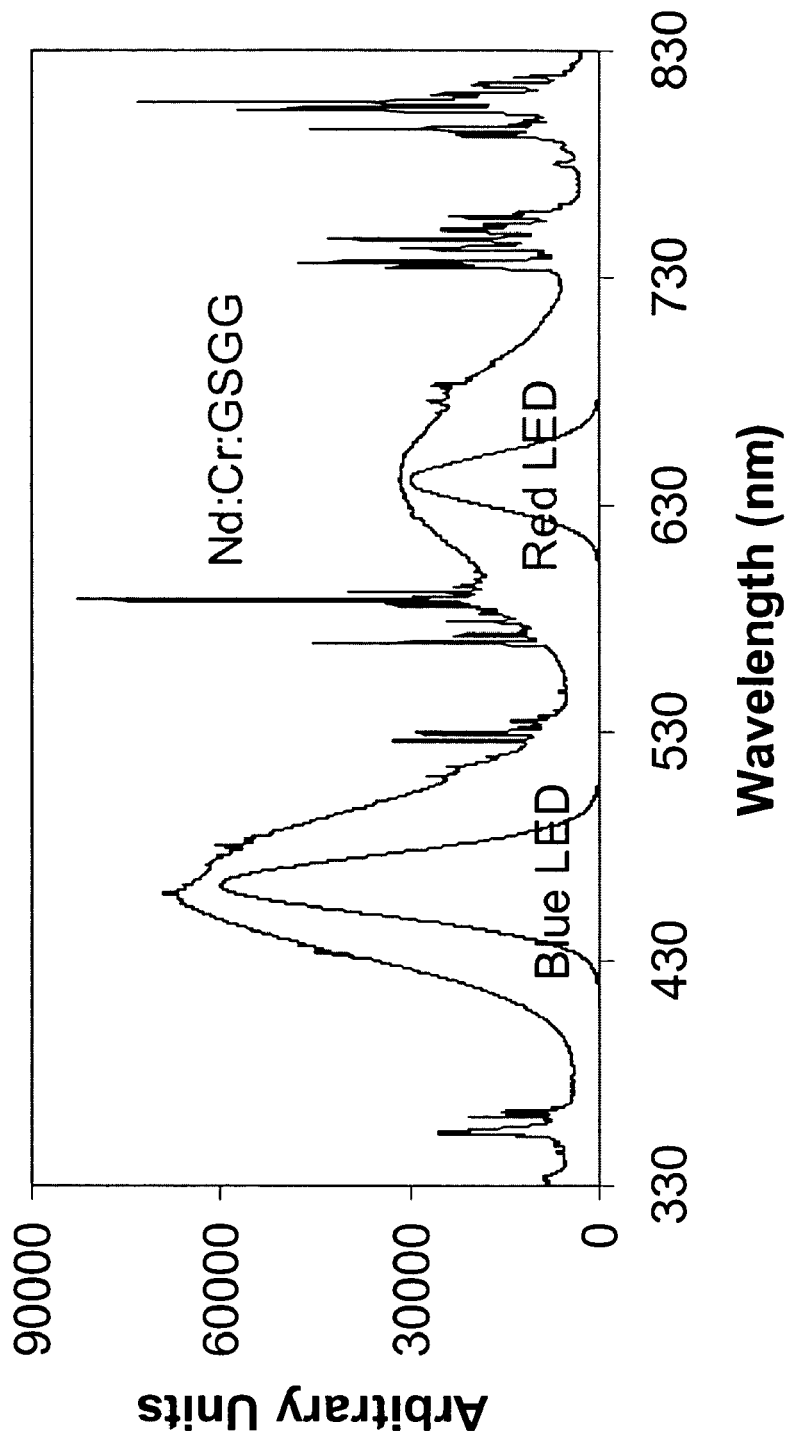
FIG. 4 is a graph comparing the absorption spectrum of Nd:Cr:GSGG crystal and LED emission spectra.

To provide a more intuitive explanation, a comparison between the absorption spectrum of Nd:Cr:GSGG crystal and two LED emission spectra is given in FIG. 4. As can be observed by inspecting FIG. 4, one can see that the absorption efficiency is maximized in both the blue (centered at 463 nm) and red (centered at 641 nm) bands.

Hereinafter, our inventive concepts and structure(s) are examined with the aid of computer simulations. Two configurations are specifically investigated. Configuration A represents a full implementation of the present invention which is a simplified structure of that depicted in FIG. 2A or FIG. 3A. More specifically, a laser gain medium (rod) is concentrically placed at the center of a cylindrically shaped diffusion chamber. Three or five of LED bars are evenly installed on the chamber wall.

Configuration B is identical to that Configuration A, but without the diffusion chamber. Therefore, it represents a partial implementation of the present invention. A comparison of the results from these two configurations shows the advantage of employing the entire, inventive coupling structure.

Figure 5A:
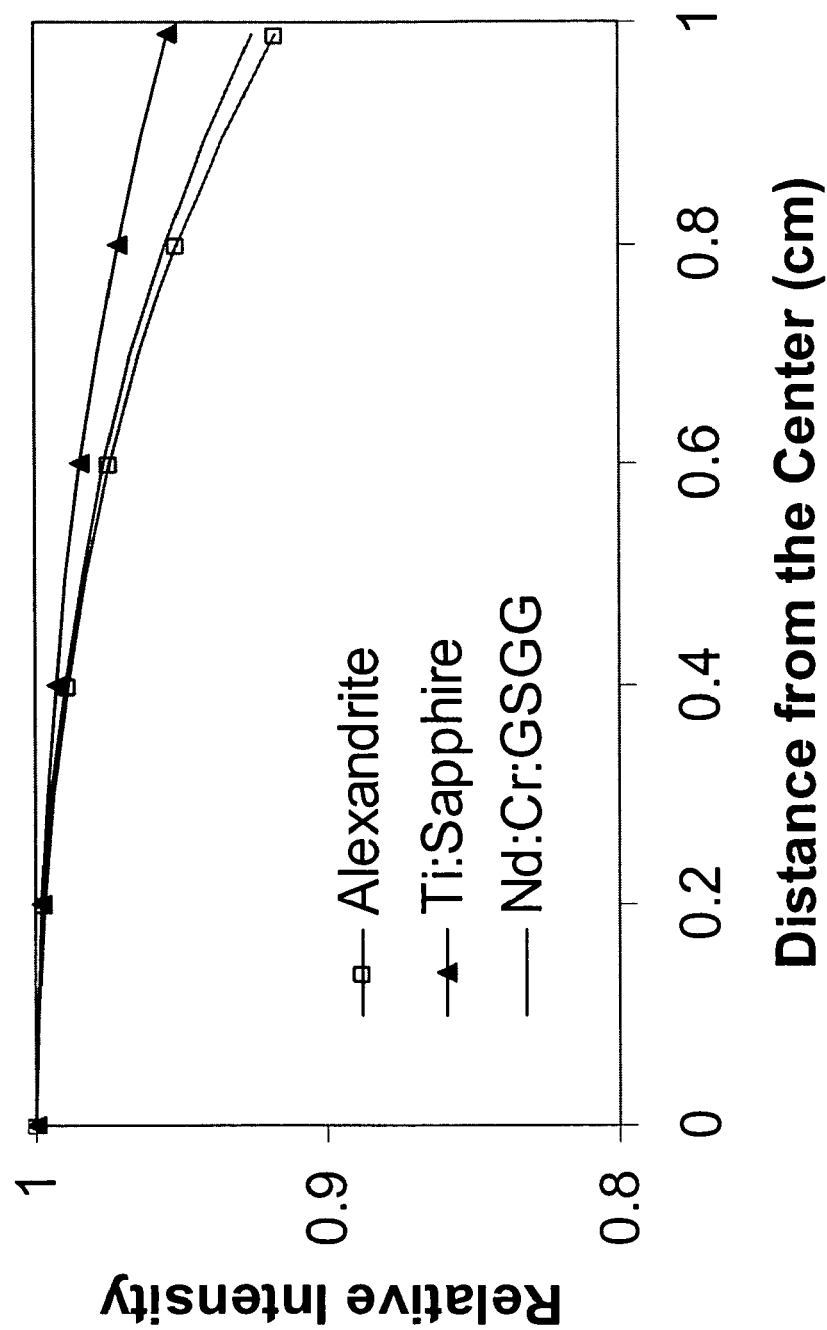
FIG. 5A is a graph showing the radial distribution of excitation in the LED-pumped Alexandrite, Nd:Cr:GSGG, and Ti:sapphire lasing medium according to the present invention.

The first simulation evaluates the pump uniformity of Configuration A. For this simulation, the diameter of the laser gain medium is assumed to be 2 mm. Radial distributions of the excitation in three different laser materials, namely Alexandrite, Nd:Cr:GSGG, and Ti:Sapphire are calculated. FIG. 5A displays the results.

With reference to that FIG. 5A, one can see that with the present invention, a uniform distribution can be achieved. In particular, the resultant illumination at the Alexandrite rod center is about 6% higher than that at the rod edge. For Nd:Cr:GSGG rod of the same geometry, the illumination at the center is 8% higher than that at the edge, while for Ti:Sapphire, it is 5%.

Figure 5B:
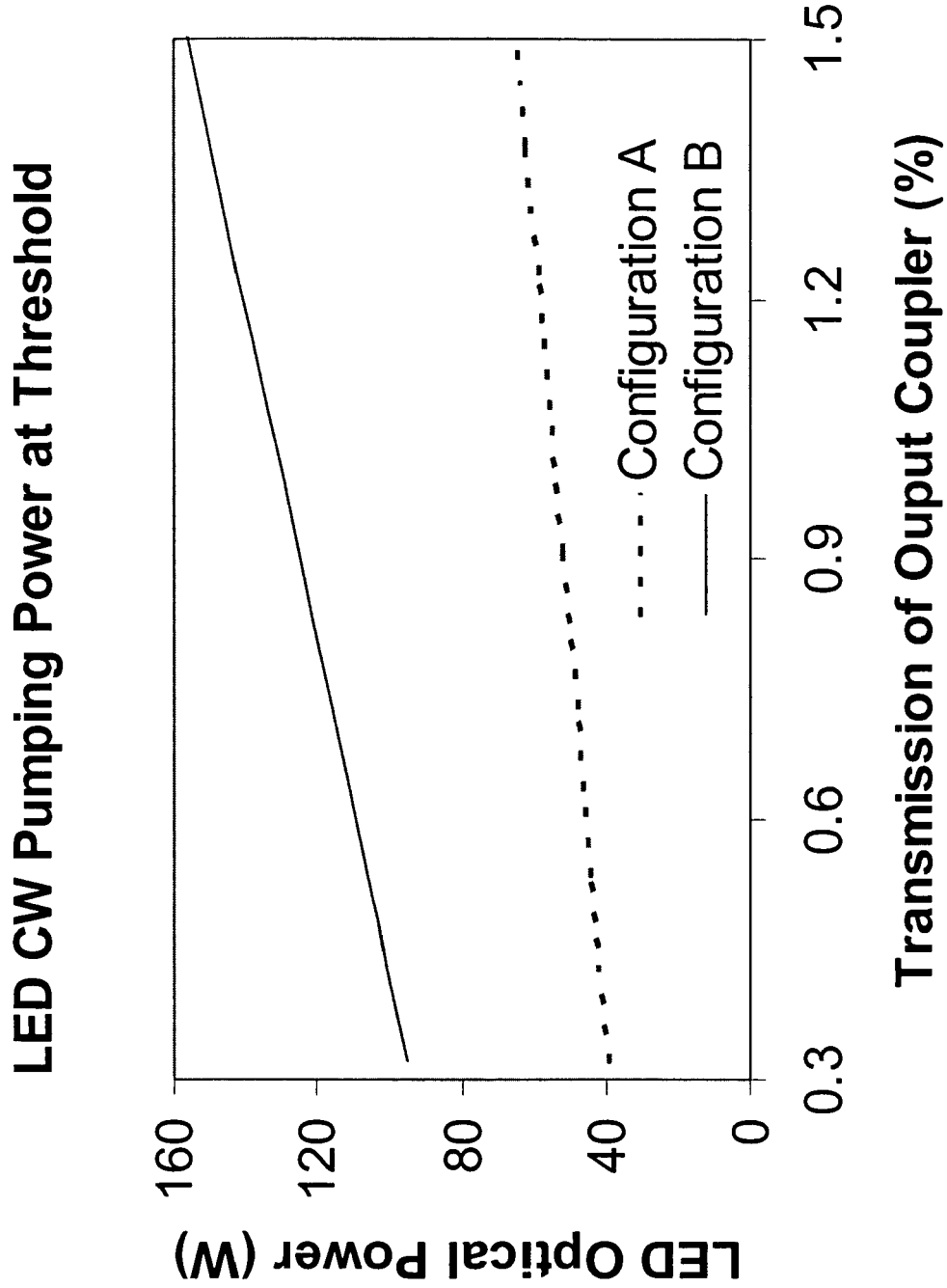
FIG. 5B is a graph showing LED pumping threshold as a function of output coupling for the LED-pumped Alexandrite laser both with, and without employing the full teachings of the present invention.

Plotted in FIG. 5B are curves of the pumping power threshold vs. the laser cavity output coupler transmission for LED pumped Alexandrite lasers. These curves clearly show that with a full implementation of the present invention, the required LED pump power to reach laser threshold may be dramatically reduced. In particular, one may conclude that our inventive structure(s) make compact, LED-pumped lasers realistic.

This conclusion appears to be valid for any solid-state lasing media, though the invented teachings here and in FIGS. 5C, 6, 7A and 7B are focused on representative types of laser gain materials including the vibronic laser crystal Alexan-

TABLE I

Major solid-state laser materials to be directly pumped by LED or VCSEL

| Host laser material | Main lasing λ (µm) | Absorption peak (µm) Bandwidth (nm) | LED pump Availability |
|---|---|---|---|
| Nd:Cr:GSGG | 1.061 | 0.46 µm, 75 nm & 0.64 µm, 120 nm | Blue or Red LED, Δλ match |
| Nd:KGW | 1.067 | 0.81 µm, 12 nm | NIR LED, or NIR VCSEL, Δλ match. |
| Ti:sapphire | 0.65-1.1 | 0.51 µm, 135 nm | Green LED, Δλ match |
| Rhodamine 6G | 0.55-0.62 | 0.51 µm, 30 nm | Green LED, Δλ match |
| $Cr^{3+}$:Alexandrite | 0.72-0.8 | 0.42 µm, 100 nm & 0.59 µm, 170 nm | Blue or Red LED, Δλ match |
| $Cr^{4+}$:YAG | 1.2-1.4 | 0.55 µm &1.1 µm, 30 nm | Green LED, or IR VCSEL, Δλ match |
| $Cr^{4+}$:Forsterite | 1.1-1.3 | | |
| $Cr^{3+}$:LiSAF, $Cr^{3+}$:LiSGaF | 0.83-0.89 0.83-0.89 | 0.45 µm, 65 nm & 0.63 µm, 100 nm | Blue or Red LED, Δλ match |
| Ho:YAG, Ho:YLF Ho:LUAG, Ho:YSAG | near 2.0 | 0.8-0.9 1.85-1.95 | NIR LED or IR VCSEL, Δλ match | drite, sensitizer assisted Nd:Cr:GSGG, and Ti:Sapphire, a vibronic crystal with very short laser upper level lifetime. As can be appreciated, these laser systems have particularly important applications.

With reference to FIG. 5B, a partial implementation of our inventive teachings of present invention is represented by Configuration B. As can be observed from that FIG. 5B, the threshold of light from LED sources, 3 mm away from the gain medium rod center, would be approximately 160 W for a laser system with an Alexandrite rod of 2 mm in diameter and the output coupler transmission of 1.5%. This requires at least 160 LEDs, each with 1 W light output. Provided that the LED conversion efficiency is 20%—which is quite a reasonable assumption—then electrical power of about 800 W would be consumed.

For a laser rod 25 mm in length, the total surface area that can be used to mount the LEDs is less than 470 $mm^2$, or less than 3 $mm^2$ per LED. While increasing the distance between the LED sources and the rod center provides more mounting area, it reduces the light-medium coupling efficiency and, consequently, requires more LEDs. For example, increasing the distance from 3 mm to 5 mm would raise the threshold by 65%, which increases the minimally required number of LEDs from 160 to 263. In summary, conventional approaches are simply not practical, both physically and economically, for LED-pumped solid-state laser systems.

On the other hand—and in sharp contrast—a suitable population inversion can be generated in the same laser system incorporating our inventive structure and only three LED bars or arrays, each having 22 individual LEDs providing 1 W light output each. Such a configuration consumes only 330 W in electrical power and the heat generated during operation can be easily removed. This threshold can be further reduced when the LEDs are operated in pulsed modes.

The above simulations are based on blue LEDs at 420 nm. As is evidenced by the curves plotted in FIG. 5C, the performance of the laser system can be greatly improved by the use of LEDs emitting orange (590 nm) light due to their higher quantum efficiency and due to the fact that their emitted light is more absorbable by the laser medium.

Figure 6:
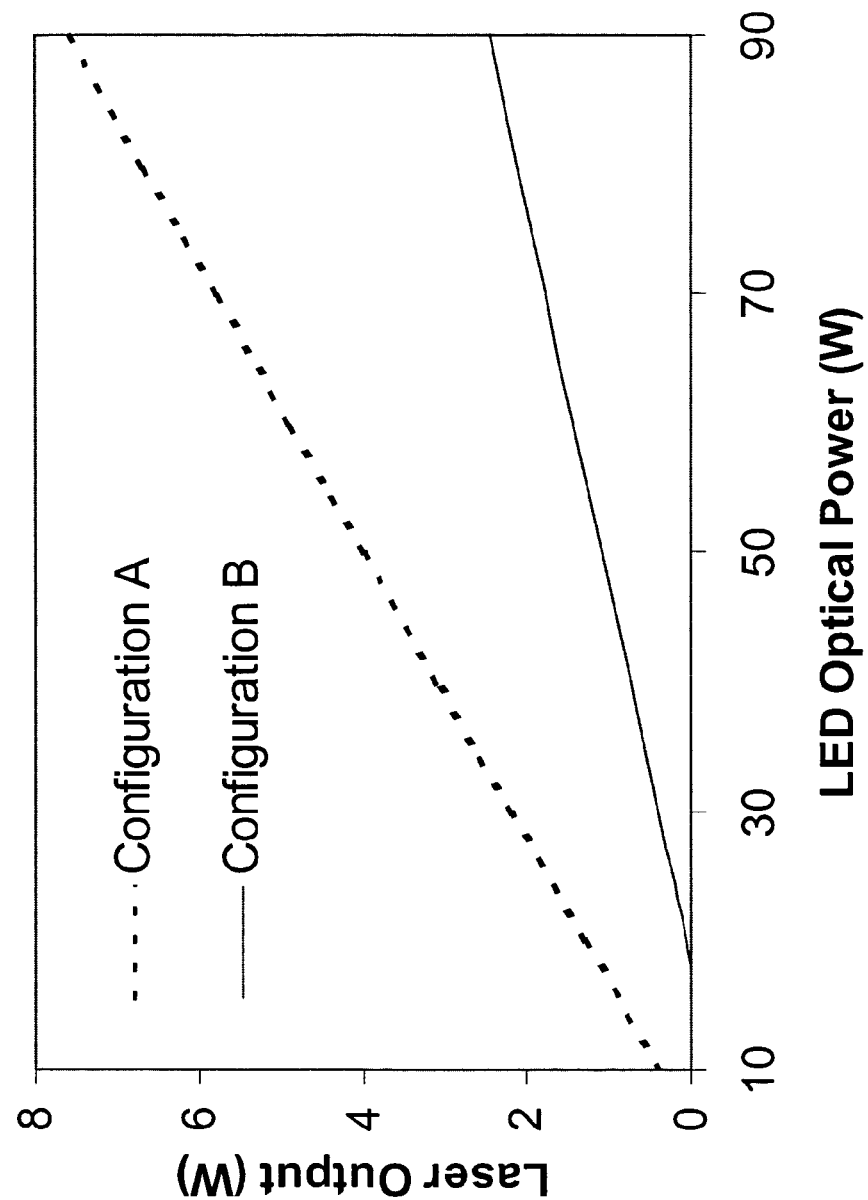
FIG. 6 is a graph showing Nd:Cr:GSGG laser output as a function of blue LED pump power, both with and without employing the full teachings of the present invention.

As is known by those skilled in the art, some laser systems utilize a sensitizer to improve the efficiency of transferring radiation from the pump source to the laser gain medium crystal. A particularly attractive sensitizer is $Cr^{3+}$ because of its broad absorption bands. Plotted in FIG. 6 are curves of laser output versus LED optical pump power for a Nd:Cr:GSGG laser of 2 mm rod in diameter with the output coupling of 1.5%. Here again, the advantage(s) of the present invention becomes clear, with respect to the differences between the two configurations, namely, Configuration A and Configuration B.

Figure 7A:
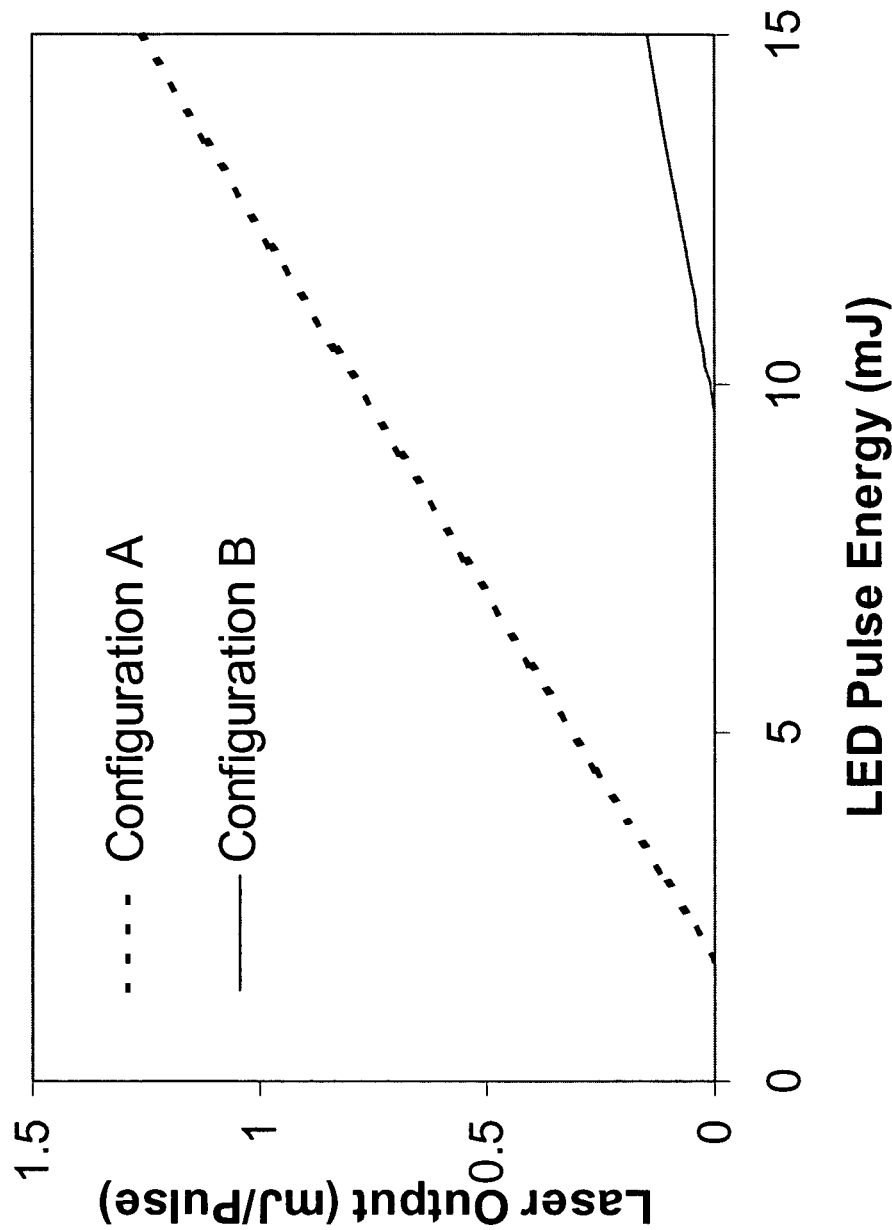
FIG. 7A is a graph showing Ti:Sapphire laser output as a function of pulsed green LED pump energy, both with and without employing the full teachings of the present invention.

Still further advantages of the present invention can be understood with reference to FIG. 7A. As can be appreciated, certain laser materials having doping atoms located within a crystal have a short lifetime for the upper level, resulting in a very high pumping threshold. For instance, the upper laser level of Ti:Sapphire material at the room temperature is only 3 μs, and will be even shorter as the temperature increases.

Consequently, and prior to our inventive teachings, commercial Ti:Sapphire lasers were typically pumped by argon laser or frequency-doubled Nd:YAG or Nd:YLF lasers to obtain CW output and pulsed operation. As described earlier, these pumping methods are complicated, expensive, unreliable, inconvenient and typically bulky. Consequently, the widespread, commercial utilization of Ti:sapphire lasers has been underdeveloped.

According to our inventive teachings, directly pumped Ti:sapphire lasers can be constructed. In particular, it is now possible to operate such laser at a pulsed mode within an allowable temperature range.

For instance, and as can be derived from FIG. 7A, 1.3 mJ/pulse output can be obtained from a Ti:Sapphire laser having a gain medium diameter of 2 mm, a coupler transmission of 2.4%, and pumped by LED arrays operating at pulsed mode with 15 mJ energy per pulse, 3 μs pulse width, and 25 kHz repetition rate. Absent our inventive teachings, the slope efficiency of such a laser system would be much lower and therefore impractical at best.

Figure 7B:
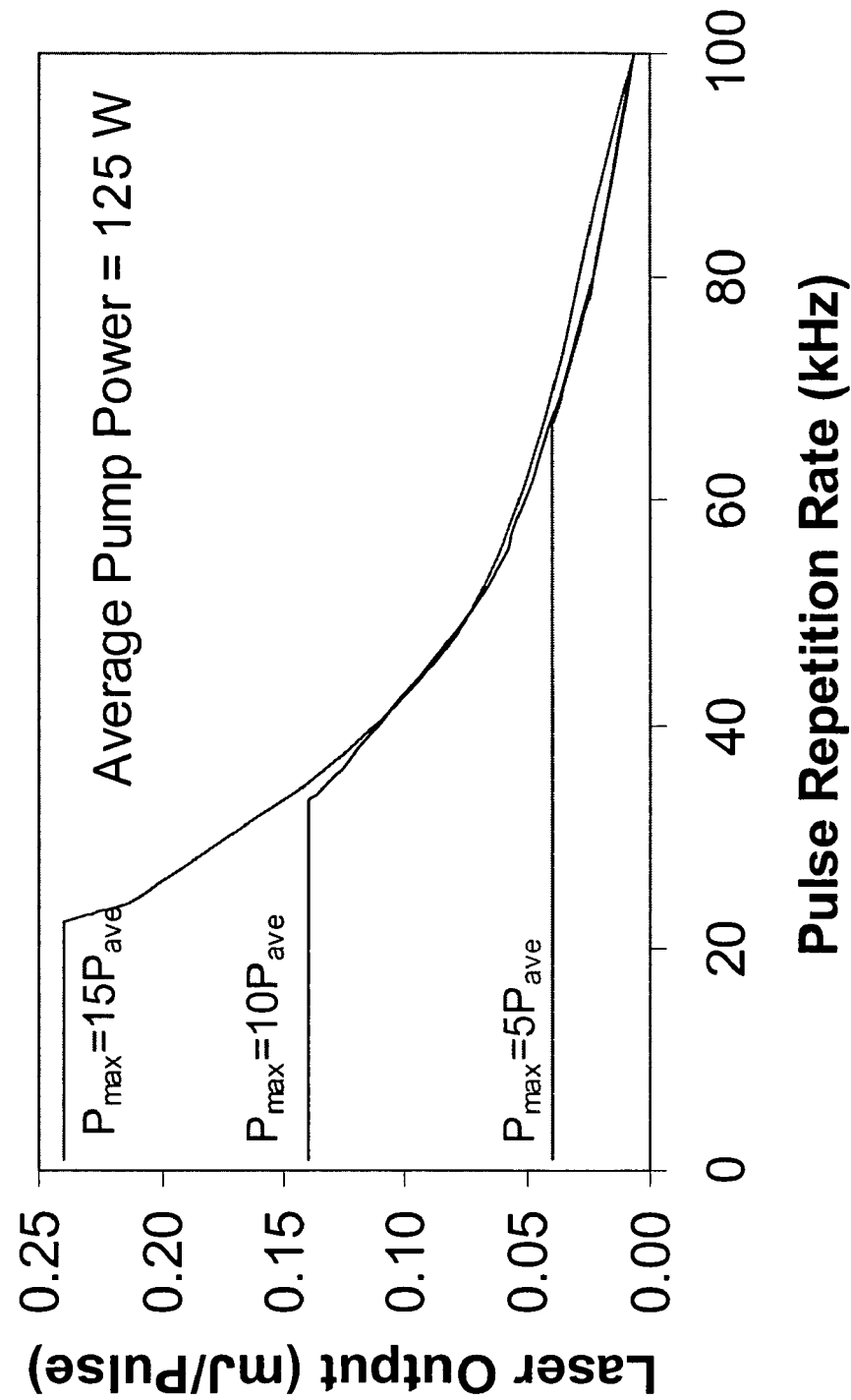
FIG. 7B is a graph showing the dependence of laser output energy on pulse repetition rate for Q-Switched Ti:Sapphire laser pumped by a total of 125 W optical power from green LED arrays according to the present invention.

The dependence of Ti:sapphire laser output energy on pulse repetition rate is depicted in FIG. 7B, wherein additional advantages resulting from the pulsed operation of laser constructed according to our inventive teachings, may be realized. As can be immediately appreciated, lasers constructed according to our inventive teachings may be operated at various high repetition rates. The three curves depicted in that FIG. 7B respectively represent three different maximum peak powers, all with a LED pump with pulse width of 3 μs.

For the laser system where the maximum peak power of the pumping pulse is operated at five times the average power, which is 125 W for Configuration A, the highest repetition rate without reduction of the output energy per pulse would be 66.7 kHz. When the LED arrays are allowed to operate the pumping power at ten times the average power, or equivalently 1250 W peak power, the laser output energy reaches 0.14 mJ/pulse for a repetition rate of up to 33.3 kHz. By further increasing the maximum peak power to 15 times the average power of 125 W, we are able to obtain laser output as high as 0.24 mJ/pulse for a repetition rate of 22.2 kHz or lower. In all these calculations, the output coupler is assumed to be 1%. Based on the discussions pertaining to FIGS. 7A and 7B, it is evident that the present invention enables Ti:sapphire lasers to be constructed and operated at high repetition rates—producing usable energy per output pulse. Importantly, and because of its exceptionally wide tuning range and high optical quality, Ti:Sapphire lasers can be used for many applications.

At this point of our discussion it should now be apparent that: 1) in order to effectively pump a solid-state laser, the incoherent, monochromatic light such as the one emitting from LED arrays must spectrally match the absorption of the gain medium, which can be quantitatively defined as the integral of the product of the two spectra over the wavelength; and 2) in order to make compact and robust lasers, the LED arrays must be able to produce high power density, preferably, 1 $W/cm^2$ or higher, depending on the specific lasing material and operation mode. In many applications, compact lasers with the ability to operate over a wide temperature ranges are required thereby increasing the importance of our inventive teachings.

Additionally, and from our initial analysis of our inventive teachings, in order to maximize the spatial match of the pump light with the gain medium, the preferable number of LED bars is three or five.

Figure 8A:
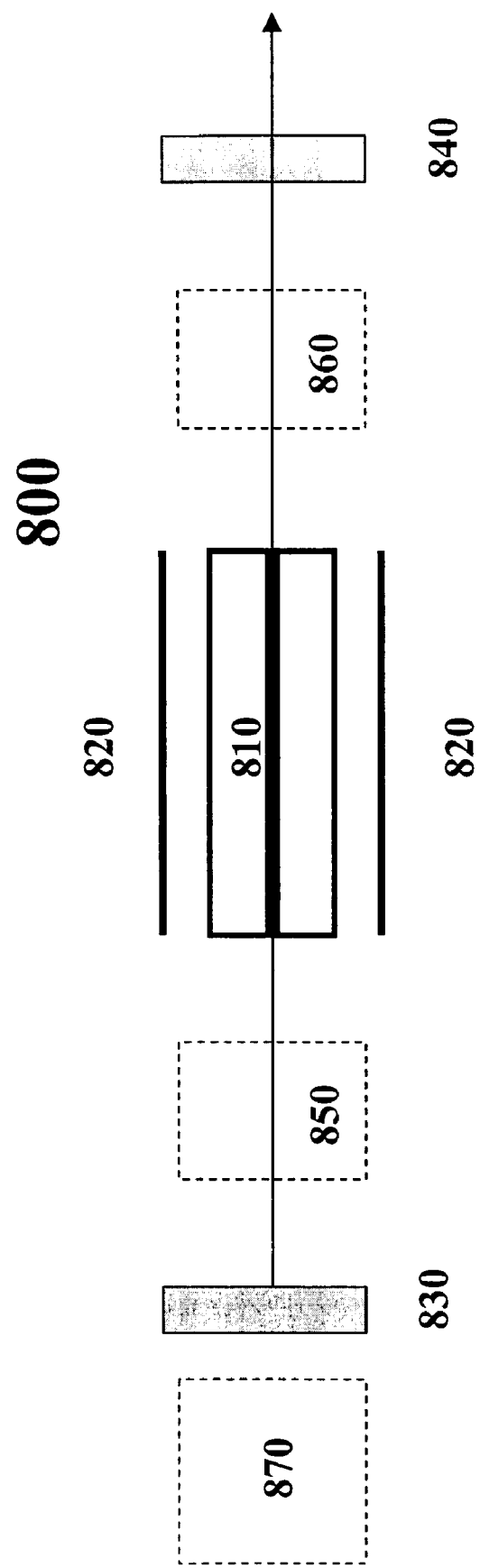
FIG. 8A is a schematic illustration of a solid-state laser constructed according to the teachings of the present invention.

Advantageously, our inventive structures can be applied to a variety of configurations to obtain desired laser outputs. Turning our attention now to FIG. 8A, there shown in that FIG. 8A, a solid-state laser system 800 that is a generalization of the inventive structure(s) shown previously, and in particular those of FIG. 1A. As can be seen from FIG. 8A, the laser system 800, includes a laser gain medium 810, LED pump sources 820, an HR mirror 830, an output coupler 840, together with optional components 850, 860, and 870.

Component 860, which can be a prism or a birefringent filter (BRF), is inserted between the laser medium 810 and the output coupler 840 to provide wavelength selection of tunable laser systems. An etalon may be used in conjunction with the prism or BRF 860 to further reduce the laser linewidth to a single longitudinal mode (SLM).

Advantageously, such lasers may operate either in CW or pulsed mode, depending on the LED pumping condition and the laser operation mode. With a specially coated dielectric chirped mirror, an LED pumped broadband laser with flat-top output in the spectral domain may be realized. As can be readily appreciated by those skilled in the art, such laser systems are highly desirable for certain applications including RGB color projection displays with minimum speckle effects, or high power laser amplifier systems with minimum nonlinear effects.

With the addition of component 850, which is inserted between the laser medium 810 and the HR mirror 830, still other useful variations of our inventive teachings can be constructed. In particular, component 850 may be a Q-switch and both AO-switching and EO-switching may be applied. In addition, the LED can operate in either CW or pulsed mode. In the latter case, the timing must be synchronized with the Q-switching.

In an alternative configuration where component 850 is an Acusto-Optical Modulator (AOM), or passive mode-locker, such as a quantum-well based saturable absorber, the laser operates on active or passive mode locking. In a more complicated configuration where component 850 is a combination of an acousto-optical modulator and a passive mode-locker, such as a quantum-well based saturable absorber, mode locking with Q-switching can be realized. With these mode-locking techniques, picosecond and femtosecond pulses can be generated.

When our inventive teachings and resulting structure(s) are further combined with optional component 870, more useful configurations can be produced. In particular, component 870 can be a seeding laser and can be embodied differently for reduction of laser build-up time, TEM00 output beam quality control, control of lasing wavelength, control of laser temporal pulse shape, to mention a few. In one embodiment, component 870 is a seeding diode laser having a single frequency used in conjunction with beam-shaping optics. The resulting structure(s) enable our inventive LED pumped lasers to operate in SLM condition. In an alternative embodiment, component 870 includes a seeding diode laser producing ultrashort (picosecond or femtosecond) pulses, in conjunction with a beam shaping system, to enable high peak power per pulse from an LED directly pumped laser, especially the pulsed LED pumped Ti:sapphire laser. In another embodiment, component 870 is a seeder producing nanosecond short pulse in pulsed operation and is used to seed a short cavity solid state laser, such as Ti:Sipphire, which is synchronously pumped by short pulse LED arrays. With this configuration, laser output of good beam quality with large beam size can be obtained in an ordinary Fabry-Perot cavity. In yet another embodiment, component 870 includes a seeding diode laser with a broad spectrum (1 nm or wider), in conjunction with a set of beam-shaping lenses. This embodiment enables a broadband laser output with high brightness and low coherence, which is particularly useful for applications such as laser projection. As should be apparent to the person skilled in the art, there are a number of other alternative embodiments of component 870.

Figure 8B:
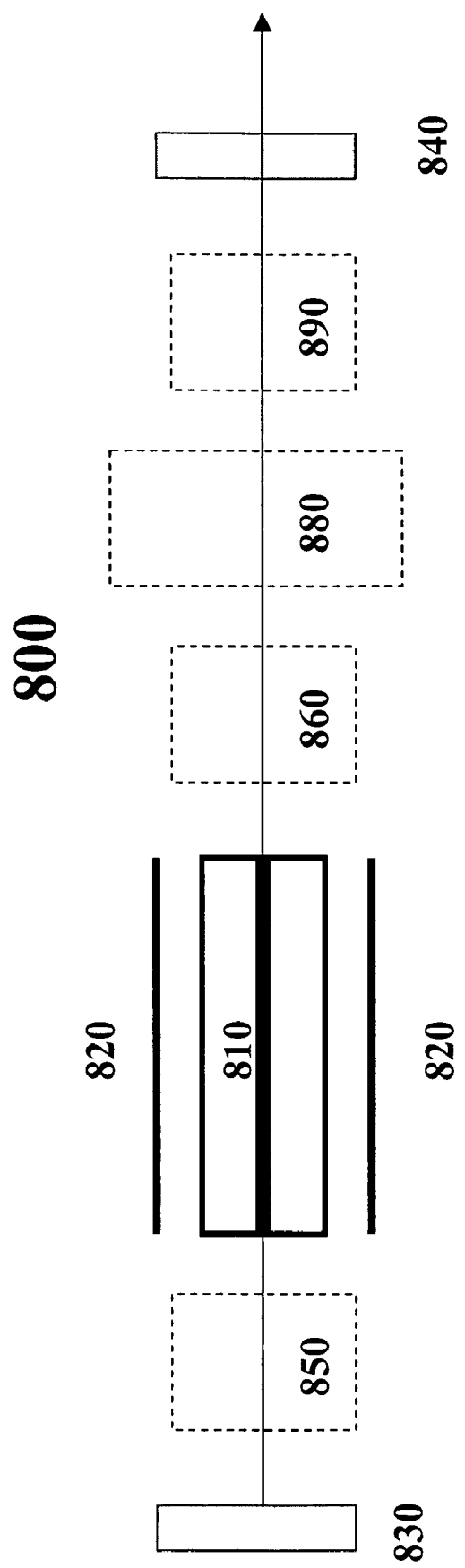
FIG. 8B is a schematic illustration of a solid-state laser having a coupling cavity and optional function blocks constructed according to the teachings of the present invention.

Advantageously, even more alternative embodiments of our inventive laser configurations can be produced. As shown in FIG. 8B, two additional components 880 and 890 can be applied. In one configuration, the component 880 may be a dichroic mirror or a thin film polarizer (TFP) that forms a coupling cavity or so-called composite cavity for intracavity nonlinear process. Component 890 may be a nonlinear optical device such as a harmonic generator or a parametric oscillator.

With this configuration, the wavelengths of LED directly pumped, Cr: and Ti:based lasers can be extended to 350-500 nm (second harmonic) and 235-335 nm (third harmonic). Specifically, a BBO, LBO, KTP, BiBO, KBBF, or a CLBO nonlinear crystal (NLC), which generates the harmonic wavelengths, can be positioned inside (or outside) of the laser cavity 800. When component 880 is used to form a composite cavity, the second harmonic is generated and oscillates therein, and generated SHG light is forced to exit from the output end.

Alternatively, component 880 can be a dichroic mirror or TFP, which sits between the primary cavity and the composite cavity and allows the passage of the primary wavelength only. Any primary light, which is not converted to its second harmonic, will return into the primary cavity for normal laser oscillation. The second harmonic thus generated, on the other hand, resonantly oscillates in a coupling cavity or so-called composite cavity formed by component 880 while can never enter the primary cavity to avoid energy loss. In this way, the frequency doubling is optimized.

In another alternative configuration, the component 880 can be a polarizer and component 890 can be an acoustic modulator or a wave plate together with a Pockels Cell for cavity rapid dumping of optical energy. This configuration can also be used to construct a regenerative amplifier. Cavity dumping or regenerative amplifier is commonly used to generate intense short laser pulses.

The inventive principles depicted previously, e.g., in FIGS. 2A and 3A, can be used to construct LED-pumped solid-state laser amplifiers. Again, various laser gain materials can be selected and the number and length of LED arrays can vary to meet the required operation conditions.

Further variations of the inventive structure can be obtained by combining our inventive principles with other techniques, e.g., highly reflecting compound parabolic concentrator (CPC), concentrator with two overlapped parabolic portions, and multiple CPCs. The CPC surface can be constructed by metal or Pyrex glass coated with highly reflecting metal film or dielectric HR thin film or highly diffuse reflecting materials such as Spectralon, BeO, MgO, or $BaSO_4$, or a highly diffuse reflecting ceramics. As can be appreciated, such a structure exhibits advantageous manufacture/assembly characteristics and is an ideal candidate as a high power pumping source.

As is clear from the above description and should be readily apparent to those skilled in the art, our inventive teachings and resulting structures are applicable to a variety of laser oscillators or amplifiers utilizing a variety of gain media. Particularly attractive host lattice materials include gadolinium gallium garnet (GGG), gadolinium scandium gallium garnet (GSGG), LiCAF, LiSAF, sapphire, KGW, ruby and alexandrite. Suitable single or multiple dopants for this lasing medium include Ti, Cr, Pr, Nd, Ho, Er, Tm, and Yb.

What is claimed is:

1. A laser device comprising:
   an optical cavity including a set of passive optical elements;
   a laser element comprising a vibronic gain crystal disposed within the optical cavity;

an excitation pump element having an odd number n of arrays of light emitting diodes (LEDs), where ($1 < n \leq 9$) for generating excitation light at a surface optical flux of at least 10 W/cm$^2$;

a diffusive reflecting pump chamber substantially tubular in shape into which is positioned the laser element such that the diffusive reflecting pump chamber effectively surrounds the laser element but for any end regions, wherein an inner surface of the pump chamber is coated with a diffusively reflective material thereby providing a diffusive reflection of pump light that strikes the inner surface sufficient to enable a multi-pass absorption of the excitation light by the laser element;

n slot-shaped transmitting windows, evenly distributed around the perimeter of the pump chamber, whereby each transmitting window provides an entrance for a pump beam emitted from one of the LED arrays, wherein the slot-shaped windows are axially parallel to the laser element such that said pump light directly emitted from the LED array is either absorbed by the vibronic gain crystal or strikes the inner surface of the pump chamber, and a power supply, electrically connected to the said excitation pump element, thereby causing said excitation element to produce excitation light;

wherein the vibronic gain crystal is a laser material in which the stimulated emission of photons is intimately coupled to the emission of vibrational quanta (phonons) in a crystal lattice.

2. The laser device according to claim 1 further comprising:
an optical resonator for producing a laser beam from the laser light generated by the laser element.

3. The laser device according to claim 1 further comprising:
a pulse controller for producing pulses of excitation light from the excitation pump element such that pulses of laser light are produced from the vibronic laser element at a rate of at least 1 Hz.

4. The laser device according to claim 1 further comprising:
a pulse forming element for producing laser light pulses at a rate of at least 1 Hz.

5. The laser device according to claim 1 further comprising:
a linewidth controller for producing controllable narrow linewidth laser light.

6. The laser device according to claim 1 further comprising:
a spectral chirp controller for producing broadband low coherent laser output.

7. The laser device according to claim 1 further comprising:
a seed laser, for providing seed laser light into the optical resonator.

8. The laser device of claim 1 further comprising:
a cooling chamber, in thermal contact with the vibronic laser element and interposed between the vibronic laser element and excitation element, said cooling chamber including a coolant, circulating through the cooling chamber, for conducting heat away from the vibronic laser element with minimum loss of desirous light and maximum suppression of unwanted light.

9. The laser device according to claim 1, further comprising a set of beam shaping lenses, interposed between the seed laser and the vibronic laser element, wherein the seed laser injects a broad spectrum signal through the set of beam shaping lenses, thereby producing a broadband laser output exhibiting high brightness and low coherence.

10. The laser device according to claim 1, wherein said vibronic laser element includes a short Fabry-Perot cavity, and the seed laser operates in a nanosecond short pulse mode such that TEM00 beam quality and lasing wavelength are effectively controlled.

11. A laser device comprising:
an optical cavity including a set of passive optical elements;

a vibronic gain medium disposed within the optical cavity, whereby a population of active ions in the vibronic gain medium becomes substantially inverted in response to excitation by incoherent or partially coherent quasi-monochromatic pump light;

an excitation pump element having a two-dimensional light emitting diode (LED) array for generating the incoherent, quasi-monochromatic excitation light at a surface optical flux of at least 10 W/cm$^2$;

a diffusive reflecting pump chamber comprising a highly reflecting, compound parabolic concentrator with one or more parabolic section(s), such that the two-dimensional LED array forms one side surface of the pump chamber while the remaining part(s) of the pump chamber surface is highly diffusely reflective at the excitation wavelength of the laser gain medium, wherein the central axis of the vibronic gain medium is located at the focus of the pump chamber, whereby a population of the active species in the laser gain medium becomes substantially inverted in response to excitation by incoherent or partially coherent quasi-monochromatic pump light, and the effects of the excitation light on the gain medium is enhanced through multiple bounces of the excitation light from the inner surface of the pump chamber; and a power supply, electrically connected to the excitation element at the array level, thereby causing said excitation element to produce the excitation light;

wherein the vibronic gain medium is a laser material in which the stimulated emission of photons is intimately coupled to the emission of vibrational quanta (phonons) in a crystal lattice.

12. A method of direct excitation of a vibronic gain crystal by a semiconductor light emitting diode (LED) light source for creating a population inversion substantially above a laser threshold comprising the steps of:

activating an odd-number greater than 1 of LED-based light sources that emit incoherent quasi-monochromatic excitation light at a surface optical flux of at least 10 W/cm$^2$;

effecting the absorption of the excitation light by the said vibronic gain crystal through the effect of a diffusive reflecting pump chamber substantially surrounding the vibronic gain crystal, wherein the inner surface of the pump chamber, except for regions where the excitation light enters said pump chamber, is diffusely reflective;

directing the excitation light into the pump chamber through slot-shaped apertures, through the effect of beam shaping optics or waveguide, such that the excitation light enters the pump chamber with negligible loss;

enhancing the effect of the incoherent, quasi-monochromatic excitation light on the vibronic gain crystal, through the action of the diffusive reflecting pump chamber by the multi-pass absorption of the excitation light by the vibronic gain crystal;

wherein the odd number of the light sources are evenly disposed around the active medium so that any unabsorbed excitation light strikes the inner surface of the pump chamber at least once;

such that a laser beam is produced within an optical resonator containing the vibronic gain crystal;

wherein the vibronic gain crystal is a laser material in which the stimulated emission of photons is intimately coupled to the emission of vibrational quanta (phonons) in a crystal lattice.

13. The method according to claim 12 further comprising the step of:

enhancing an exit of the incoherent quasi-monochromatic excitation light through the use of any combination of the following: a photonic crystal layer, polymer domes and coupling lenses.

14. The method according to claim 12 wherein the generated incoherent quasi-monochromatic excitation light has a pulse duration effectively matching an upper-state lifetime of the vibronic gain crystal, said method further comprising the steps of:

enhancing pumping peak power at a given average value; and generating laser pulses having a repetition rate inversely proportional to the upper state lifetime.

15. The method according to claim 12 wherein said vibronic gain crystal includes Ti:Sapphire and has an upper-state lifetime of 3 μs or shorter.

16. The method according to claim 12 further comprising the steps of:

producing UV light through the effect of one or more nonlinear optical components.

17. The method according to claim 12 wherein said activating step further comprising the steps of:

producing pulses of excitation light from the excitation element such that pulses of laser light are produced in the optical resonator.

18. The laser device of claim 1 wherein said vibronic gain crystal is one selected from the group consisting of: Ti doped sapphire; Cr doped Alexandrite, Cr doped LiSAF, Cr doped LiSGaF, Cr doped YAG, Cr:LiCAF, Cr2+:ZnSe, Fe2+:ZnSe.

19. The laser device of claim 11 wherein said vibronic gain medium is one selected from the group consisting of: Ti doped sapphire; Cr doped Alexandrite, Cr doped LiSAF, Cr doped LiSGaF, Cr doped YAG, Cr:LiCAF, Cr2+:ZnSe, Fe2+:ZnSe.

20. The method of claim 12 wherein said vibronic gain crystal is one selected from the group consisting of: Ti doped sapphire; Cr doped Alexandrite, Cr doped LiSAF, Cr doped LiSGaF, Cr doped YAG, Cr:LiCAF, Cr2+:ZnSe, Fe2+:ZnSe.

* * * * *